(12) United States Patent
Steinbuch et al.

(10) Patent No.: US 11,079,474 B2
(45) Date of Patent: Aug. 3, 2021

(54) DEVICE FOR PROCESSING OR GENERATING A SIGNAL, AND METHOD FOR ASCERTAINING AN ADJUSTMENT

(71) Applicant: Robert Bosch GmbH, Stuttgart (DE)

(72) Inventors: Dirk Steinbuch, Wimsheim (DE); Karin Moertlbauer, Weil der Stadt (DE); Matthias Steinhauer, Steinheim (DE); Michael Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 15/780,437

(22) PCT Filed: Oct. 19, 2016

(86) PCT No.: PCT/EP2016/075020
§ 371 (c)(1),
(2) Date: May 31, 2018

(87) PCT Pub. No.: WO2017/102138
PCT Pub. Date: Jun. 22, 2017

(65) Prior Publication Data
US 2018/0372842 A1    Dec. 27, 2018

(30) Foreign Application Priority Data

Dec. 17, 2015 (DE) .......................... 102015225592.1

(51) Int. Cl.
*G01S 7/40* (2006.01)
*H04B 1/04* (2006.01)
*H04B 1/18* (2006.01)

(52) U.S. Cl.
CPC .............. *G01S 7/40* (2013.01); *H04B 1/0458* (2013.01); *H04B 1/18* (2013.01)

(58) Field of Classification Search
CPC ............ G01S 7/40; H04B 1/0458; H04B 1/18
See application file for complete search history.

(56) References Cited

U.S. PATENT DOCUMENTS

2010/0030107 A1*  2/2010  Hancock .............. A61B 5/0507
                                                                    600/567
2010/0093293 A1   4/2010  Grebennikov et al.
2010/0168730 A1*  7/2010  Hancock .............. A61B 5/7264
                                                                    606/33

(Continued)

FOREIGN PATENT DOCUMENTS

CN        103424634 A    12/2013
DE    102009045546 A1     5/2010
(Continued)

*Primary Examiner* — Timothy A Brainard
(74) *Attorney, Agent, or Firm* — Norton Rose Fulbright US LLP; Gerard Messina

(57) ABSTRACT

A device for generating and/or processing a signal, and a method for ascertaining an adjustment of a device for processing or generating a signal. The method includes the steps: generating a transmission signal or a test signal with the aid of a signal device of a device; separating first signals, which come to the signal device from an interface device of the device, from second signals which come to the interface device from the signal device, the interface device being coupleable or coupled to a transmitting and/or receiving antenna; and outputting the first and the second signals separately from one another.

10 Claims, 4 Drawing Sheets

(56) References Cited

U.S. PATENT DOCUMENTS

| | | | |
|---|---|---|---|
| 2012/0146425 A1* | 6/2012 | Lee | H04B 5/0025 |
| | | | 307/104 |
| 2012/0229330 A1* | 9/2012 | Grebennikov | G01S 13/87 |
| | | | 342/175 |
| 2014/0120849 A1* | 5/2014 | Peltonen | H04B 1/40 |
| | | | 455/77 |
| 2015/0200437 A1 | 7/2015 | Solomko et al. | |
| 2016/0013953 A1* | 1/2016 | Boggan | H01P 3/081 |
| | | | 327/551 |
| 2016/0161397 A9* | 6/2016 | Cyr | G01M 11/335 |
| | | | 356/73.1 |
| 2016/0299215 A1* | 10/2016 | Dandu | G01S 13/426 |

FOREIGN PATENT DOCUMENTS

| | | |
|---|---|---|
| JP | 2010276372 A | 12/2010 |
| JP | 2014513272 A | 5/2014 |
| JP | 2015149765 A | 8/2015 |
| WO | 2014112929 A1 | 7/2014 |

\* cited by examiner

DEVICE FOR PROCESSING OR GENERATING A SIGNAL, AND METHOD FOR ASCERTAINING AN ADJUSTMENT

FIELD

The present invention relates to a device for processing or generating a signal, in particular for processing a high-frequency signal (HF signal) that is received by an external antenna device coupled to the device, and/or for generating a signal, which for the transmission is sent with the aid of an external antenna device coupled to the device. Moreover, the present invention relates to a method for ascertaining an adjustment of a device for processing or generating a signal. The signal to be processed or generated is in particular a high-frequency signal, for example a radar signal.

BACKGROUND INFORMATION

Devices for processing or generating signals are used in radar sensors, for example. Automotive radar sensors in the 77-GHz band for the near and medium distance range operate primarily with separated transmitting and receiving antennas. These antennas are implemented as resonant structures on a suitable high-frequency circuit board (HF circuit board). The passive antennas are interconnected to an active transmitter or receiver microwave circuit (a monolithic microwave integrated circuit (MMIC), for example) with the aid of microstrip lines, using suitable integrated circuit packaging. In the process, a junction point is created between the HF circuit board and the active circuit, which may result in fluctuations in carrying out this high-frequency signal transition. For example, undesirable back-reflections of a transmission signal as well as undesirable back-reflected reception power output result in degradation of radar sensors with regard to range.

A radar transceiver for microwave and millimeter wave applications is described in German Patent Application No. DE 103 00 955 A1.

SUMMARY

In accordance with the present invention, an example device for processing or generating a signal is provided, which includes: a substrate; a signal device that is designed for processing a reception signal and/or for generating a transmission signal; an interface device with the aid of which the signal device is coupleable to a transmitting and/or receiving antenna for sending the generated transmission signal and/or for receiving the reception signal to be processed; a separation device that is designed for separating first signals, which come to the signal device from an interface device, from second signals which come to the interface device from the signal device; and an output device at which the separated first and second signals are separately tappable for computing an adjustment, the signal devices, the interface device, the separation device, and the output device being situated on the substrate, in particular integrated into the substrate.

An adjustment is understood to mean a variable that is suitable for indicating an efficiency of a transition between a transmitting and/or receiving antenna on the one hand and a device for processing or generating a signal on the other hand. The adjustment may in particular be a quotient of a reflected power output and a continuous power output without reflection. After the coupling, a junction point results between the interface device and the transmitting and/or receiving antenna, at which undesirable reflections may take place.

Moreover, the present invention provides a method for ascertaining an adjustment of a device, in particular the device according to the present invention, for processing or generating a signal, including the steps: generating a transmission signal and/or a test signal with the aid of a signal device of a device whose adjustment is to be ascertained; separating first signals, which come to the signal device from an interface device of the device, from second signals which come to the interface device from the signal device, the interface device being coupled to a transmitting and/or receiving antenna; and providing the first and second signals separately. Based on the separated first and second signals, an output signal may be generated which indicates the adjustment of the device. The first and second signals being tappable or provided is understood in particular to mean that they are available for the device itself or for external measuring devices, or are processed by same.

The example device according to the present invention and the example method according to the present invention allow forward and return signals to be separated, and in particular allow their power output to be measured. Forward and return power outputs may be measured constantly, i.e., continuously, during operation of the device. Data concerning the quality of a high-frequency transition between the device and a transmitting and/or receiving antenna may thus be directly available at all times.

The approach according to the present invention is suitable for bistatic radars with separated transmitting and receiving antennas, as well as for monostatic radars with joint transmitting and receiving antennas.

The adjustment of an HF circuit board, for example with transmitting and/or receiving antennas, from the device, for example an MMIC, may be advantageously measured using an external measuring technique. Alternatively or additionally, measuring the adjustment from the device from the direction of the HF circuit board is also possible. Findings about the adjustment, obtained from the device or also from the circuit board, may be used to improve the junction point. The generation and/or processing of the transmission or reception signal may be automatically adjusted, based on the ascertained adjustment. Causes for losses in performance may be ascertained more easily. A function of the high-frequency interface, i.e., the junction point between the device and the circuit board, may be monitored during operation of the device. It is also optionally possible for a signal that is to be transmitted and/or a received signal to be adjusted, for example amplified, based on the obtained findings.

Advantageous specific embodiments and refinements are described herein, with reference to the figures.

According to one preferred refinement, the substrate together with the signal device, the interface device, the separation device, and the output device is designed as a monolithic microwave integrated circuit.

According to another preferred refinement, the separation device is designed as a directional coupler or as a ring coupler. It is thus possible to separate the first and the second signals from one another in a particularly efficient manner.

According to another preferred refinement, the separation device is designed with four ports. In particular, the separation device may be designed as a four-port directional coupler or as a four-port ring coupler.

According to another preferred refinement, the output device includes a processing unit that is designed for generating, based on the separated first and second signals, an output signal that indicates an adjustment of the device. An external processing unit for determining the adjustment may thus be dispensed with, as the result of which the device according to the present invention may be used more flexibly.

According to another preferred refinement, the output device includes a first analog-digital converter that is designed for converting the first signals from analog signals into digital signals. The output device preferably also includes a second analog-digital converter that is designed for converting the second signals from analog signals into digital signals. The above-described processing unit may be designed in particular for processing the converted digital first and second signals.

According to another preferred refinement, the signal device is designed for processing a reception signal, and includes a mixer and a test signal provision device. The test signal provision device is designed for providing a test signal and feeding it nondirectionally between the separation device and the mixer. Thus, a test signal is providable even for a device that is not designed for generating a signal to be transmitted, on the basis of which the adjustment of the device according to the present invention is ascertainable.

According to one preferred refinement, the method according to the present invention is carried out continuously during a transmission operation of the device.

According to another preferred refinement, the method is carried out in a test mode of the device.

BRIEF DESCRIPTION OF THE DRAWINGS

The present invention is explained in greater detail below, based on the exemplary embodiments illustrated in the schematic figures.

DETAILED DESCRIPTION OF EXAMPLE EMBODIMENTS

Figure 1:
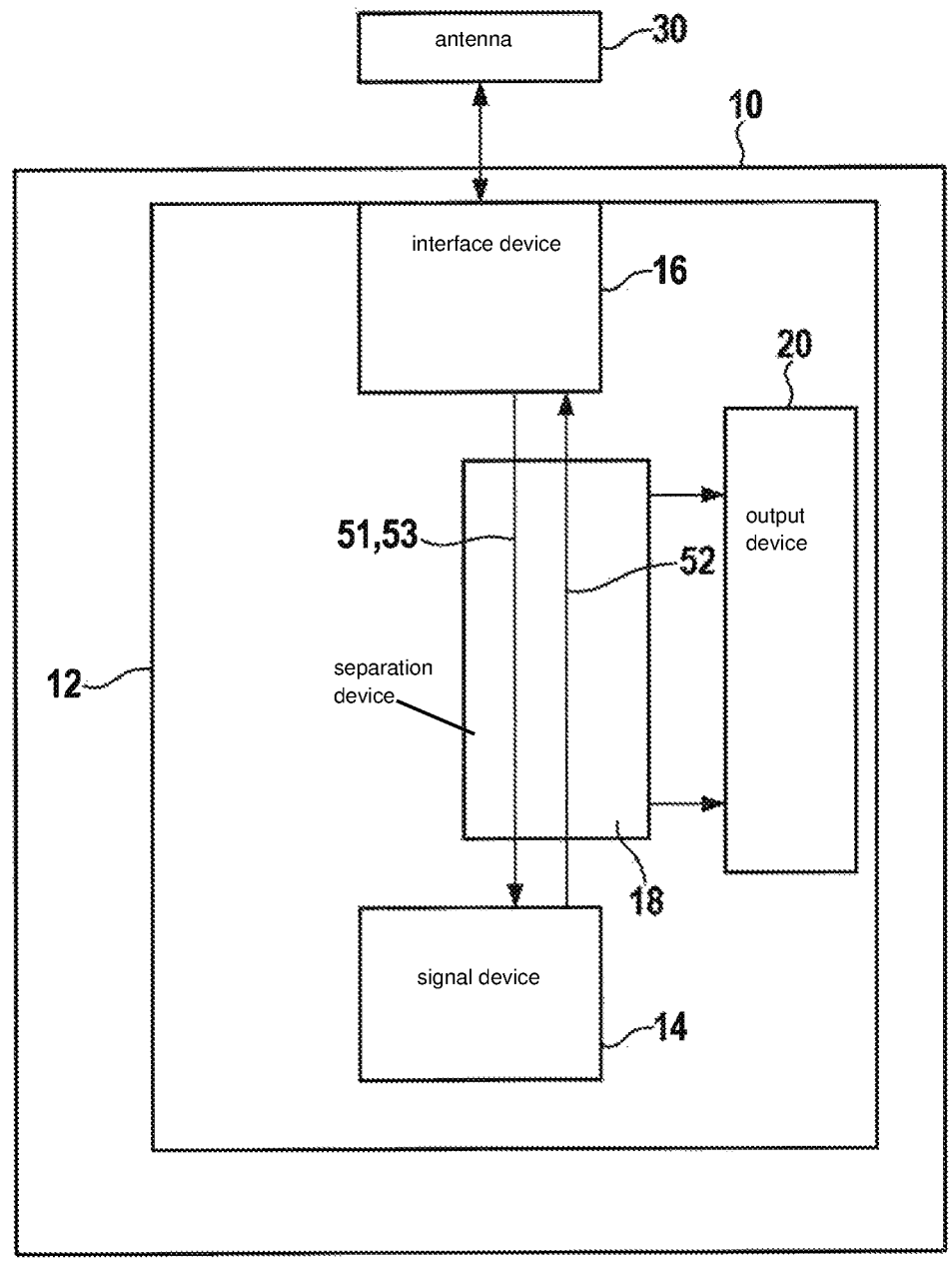
FIG. 1 shows a schematic circuit diagram of a device for processing or generating a signal according to one specific embodiment of the present invention.

Unless stated otherwise, identical or functionally equivalent elements are provided with the same reference numerals in all figures. The numbering of method steps is used for clarity, and in particular is not to be construed as a specific chronological sequence unless stated otherwise. In particular, multiple method steps may also be carried out concurrently.

FIG. 1 shows a schematic circuit diagram of a device 10 for processing or generating a signal 51, 52 according to one specific embodiment of the present invention.

Device 10 includes a substrate 12 in which the further components and units of device 10 are provided, preferably in an integrated manner.

Device 10 includes a signal device 14 that is designed for processing a reception signal 51 and/or for generating a transmission signal 52. If signal device 14 is designed solely for generating a transmission signal 52, signal device 14 may also be referred to as a signal generation device. If the signal device is designed solely for processing a reception signal 51, signal device 14 may also be referred to as a signal processing device. Signal device 14 may in particular include power electronic components, microprocessors, logic circuits, and the like.

Device 10 also includes an interface device 16, with the aid of which signal device 14 is coupleable or coupled to a transmitting and/or receiving antenna 30, in particular an external transmitting and/or receiving antenna 30, for transmitting generated transmission signal 52 and/or for receiving reception signal 51 to be processed. External transmitting and/or receiving antenna 30 may, for example, be provided on a high-frequency circuit board as a passive, resonant structure. The coupling of transmitting and/or receiving antenna 30 to device 10, i.e., to substrate 12, in particular to signal device 14, may take place, for example, via microstrip lines and other suitable integrated circuit packaging, for example by bonding a bare chip, soldering a BGA-MMIC, and the like.

Device 10 also includes a separation device 18 that is designed for separating first signals 51, 53, which come to signal device 14 from interface device 16, from second signals 52 that come to interface device 16 from signal device 14. First signals 51, 53 may in particular include a reception signal 51 that is received by transmitting and/or receiving antenna 30 and is to be processed by signal device 14. Second signals 52 may in particular include a transmission signal 52 that is generated by signal device 14, and that is designed for transmission by transmitting and/or receiving antenna 30.

First signals 51, 53 that come to signal device 14 from interface device 16 may also include signals 53 that are reflected on interface device 16 and/or on a junction point between interface device 16 and coupled transmitting and/or receiving antenna 30. Reflected signals 53 may result, for example, from transmission signal 52, which is generated by signal device 14 and which for the transmission is relayed to interface device 16 by transmitting and/or receiving antenna 30, being partially or completely reflected on interface device 16 and/or on the junction point between interface device 16 and transmitting and/or receiving antenna 30. A transmission power output arriving at transmitting and/or receiving antenna 30 is thus reduced by reflected signals 53. The extent of this reduction is indicated by the "adjustment" parameter.

Device 10 is also provided with an output device 20 at which separated first and second signals 51, 52, 53 are tappable for computing the adjustment. Processing of separated first and second signals 51, 52, 53 may take place using an external processing unit, for example. However, a device 10 may also include an appropriate processing unit.

Signal device 14, interface device 16, separation device 18, and output device 20 are situated on substrate 12, in particular integrated into substrate 12.

Figure 2:
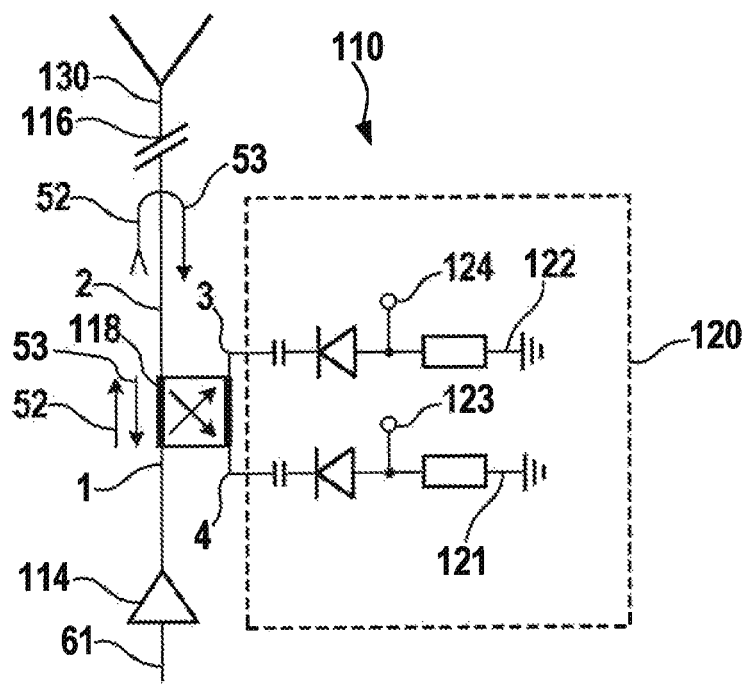
FIG. 2 shows a schematic circuit diagram of a device for processing or generating a signal according to another specific embodiment of the present invention.

FIG. 2 shows a schematic circuit diagram of a device 110 for processing or generating a signal 51, 52 according to another specific embodiment of the present invention. Device 110 is a variant of device 10.

Device 110 includes a signal device 114 that is designed for amplifying an incoming raw signal 61 with the aid of an amplifier, and providing same as a transmission signal 52. Device 110 also includes an interface device 116, with the aid of which signal device 114 is coupleable or coupled to a transmitting and receiving antenna 130. Transmitting and receiving antenna 130 may be part of device 110 or may be provided separately from same. Device 110 is usable in particular as a, or in a, bistatic radar. Transmission signal 52 is conducted to interface device 116 from signal device 114 via a dedicated line. A directional coupler 118, in particular a 90° hybrid directional coupler, is connected between signal device 114 and interface device 116 as a separation device 118 for device 110.

A directional coupler is in particular a four-port component, known from high-frequency technology, which via a suitable design of the impedance or line length allows individual coupling of signals at its four ports. In particular, a forward signal is present at a first input port 1, and a reverse signal is present at a second input port 2. A decoupled forward signal is present at a third output port 3, and a decoupled reverse signal is present at a fourth output port 4. Fourth output port 4 is insulated with respect to first input port 1, and third output port 3 is insulated with respect to second input port 2, thus allowing a directional separation. In device 110, first input port 1 is connected to signal device 114. Second input port 2 is connected to interface device 116, and third and fourth output ports 3, 4 are connected to an output device 120 of device 110.

Signal device 114 is also designed for processing a reception signal 51 which is received by transmitting and receiving antenna 130 and which is transmitted via first and second input ports 1, 2.

As shown in FIG. 2, a first measuring device 121 of output device 120 is connected to fourth output port 4, and a second measuring device 122 of output device 120 is connected to third output port 3. At first measuring device 121, an electrical signal that represents or indicates first signals 51, 53 that come to signal device 114 from interface device 116, in particular as described with regard to device 10, may be tapped between a first electrical contact 123 and ground (GND). A capacitor and/or a rectifier diode, for example, may be situated between first contact 123 and fourth output port 4 in the blocking direction, as shown in FIG. 2.

At second measuring device 122, an electrical signal that represents or indicates second signals 52 that come to interface device 116 from signal device 114, in particular as described with regard to device 10, may be tapped between a second electrical contact 124 and ground. A capacitor and/or a rectifier diode, for example, may be situated between second contact 124 and third output port 3 in the blocking direction, as shown in FIG. 2.

Figure 3:
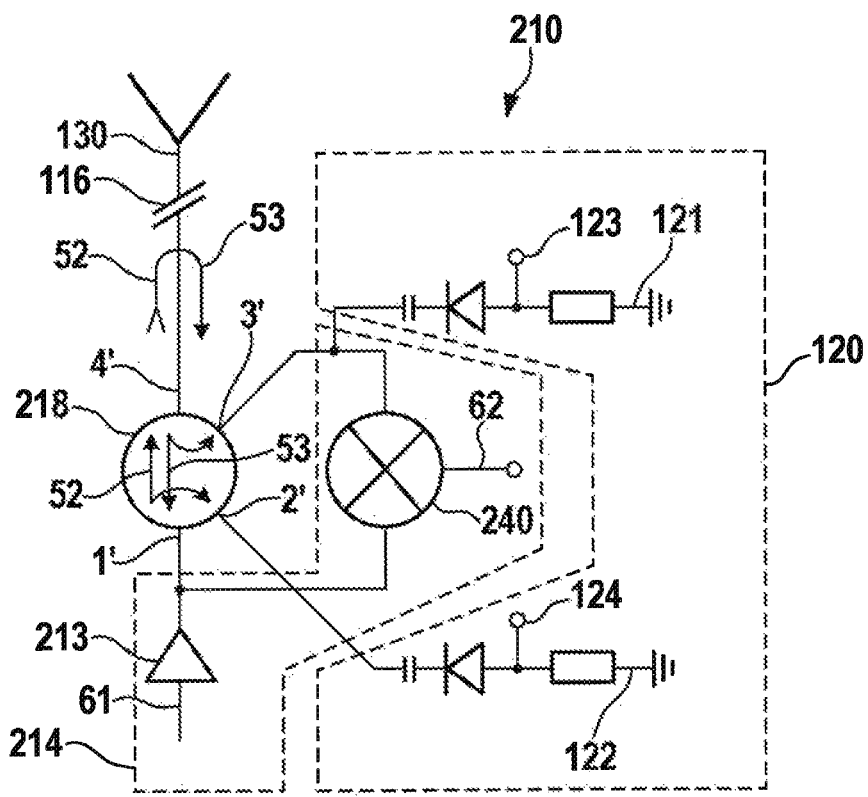
FIG. 3 shows a schematic circuit diagram of a device for processing or generating a signal according to yet another specific embodiment of the present invention.

FIG. 3 shows a schematic circuit diagram of a device 210 for processing or generating a signal 51, 52 according to yet another specific embodiment of the present invention. Device 210 is a variant of device 110, and differs from same essentially with respect to separation device 218 of device 210 and the type of signal processing.

Device 210 includes a signal device 214 that is designed for generating a transmission signal 52 based on a raw signal 61, and for processing a reception signal 51 for generating a useful signal 62.

Separation device 218 of device 210 is designed as a ring coupler 218 with first through fourth ports 1', 2', 3', 4'. Signal device 214 is connected to a first port 1' and to a third port 3', and interface device 116 of device 210 is connected to a fourth port 4' of ring coupler 218, which may also be referred to as a "rat race coupler." Second measuring device 121 of output device 120 of device 210 is designed as described with reference to FIG. 2, and is connected to a second port 2' of ring coupler 218. A first measuring device 121 designed as described with regard to device 110 is connected to a third port 3' of ring coupler 218. A signal amplifier 213 of signal device 214, which is designed for amplifying raw signal 61 for generating transmission signal 52, is connected to first port 1'.

Signal device 214 also includes a mixer 240 which is designed for processing a reception signal 51 that is received from transmitting and receiving antenna 130 via interface device 116.

Mixer 240 receives a signal, which is branched off from third port 3' of ring coupler 218, as an input signal. Mixer 240 receives the signal, which is present at first port 1' of ring coupler 218, as an oscillator signal, i.e., as an LO signal. Mixer 240 is designed for generating a useful signal 62 by mixing the input signal and the oscillator signal; the useful signal may be used, for example, for further processing of information content of reception signal 51.

Figure 4:
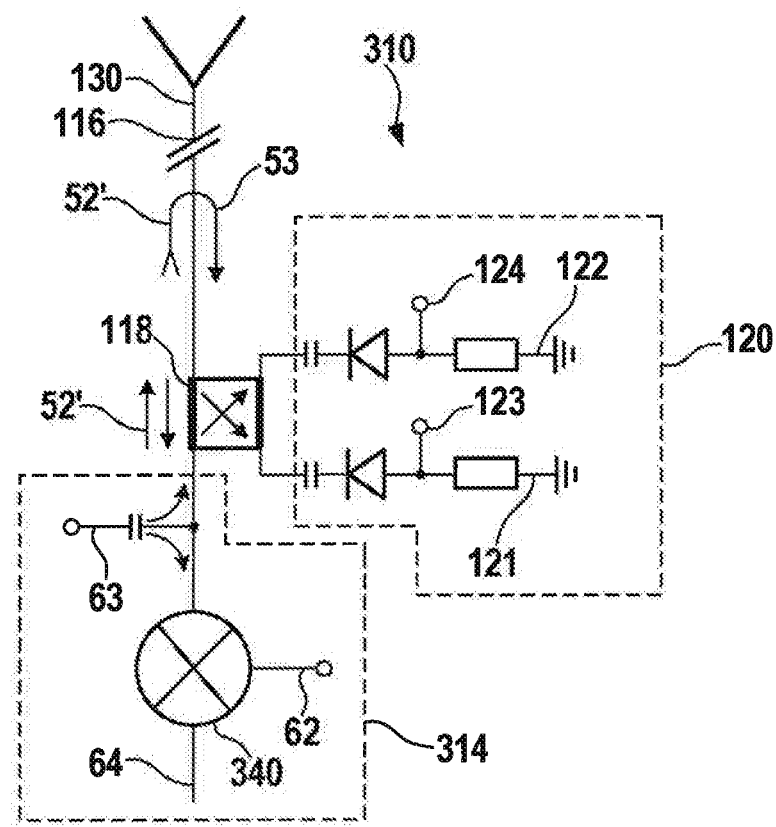
FIG. 4 shows a schematic circuit diagram of a device for processing or generating a signal according to yet another specific embodiment of the present invention.

FIG. 4 shows a schematic circuit diagram of a device 310 for processing a signal 52 according to yet another specific embodiment of the present invention. Device 310 is another variant of device 110.

In comparison to device 110, device 310 is designed solely for reception, i.e., for processing a reception signal 51 that is receivable by a receiving antenna 330 of device 310 and transmittable to signal device 314 of device 310 via interface device 116 of device 310. Interface device 116, separation device 118, and output device 120 are designed as described with regard to device 110.

Signal device 314, which may be referred to as a signal processing device 314, includes a mixer 340 and a test signal provision device 342. Mixer 340 is designed for receiving an oscillator signal, i.e., an LO signal 64, and mixing it with reception signal 51, received from interface device 116, in order to generate a useful signal 62. Thus, in device 310, in comparison to devices 10; 110; 210 described above, a reference signal for determining the adjustment would not be present. For this purpose, device 310 includes test signal provision device 342, which is designed for providing a test signal 63 and nondirectionally feeding it between separation device 118, in particular at first input port 1 of separation device 118, and mixer 340. Test signal 63 may in particular be derived from high-frequency LO signal 64 by test signal provision device 342, test signal provision device 342 also being designed for applying a frequency offset with the aid of suitable methods. After the mixing with LO signal 64, this frequency offset manifests itself as a low-frequency baseband signal.

Due to the nondirectional feeding of test signal 63, one-half of the signal power of test signal 63 is conducted in the direction of interface device 116, and thus acts as an effective transmission signal 52'. By use of the same method described with regard to device 110, it is now once again possible, with the aid of separation device 118, to provide first and second signals 51, 52', 53 for determining the adjustment. The described feeding of test signal 63 may be carried out in particular in a test mode of device 310, while in particular regular reception of a reception signal 51 does not take place.

Figure 5:
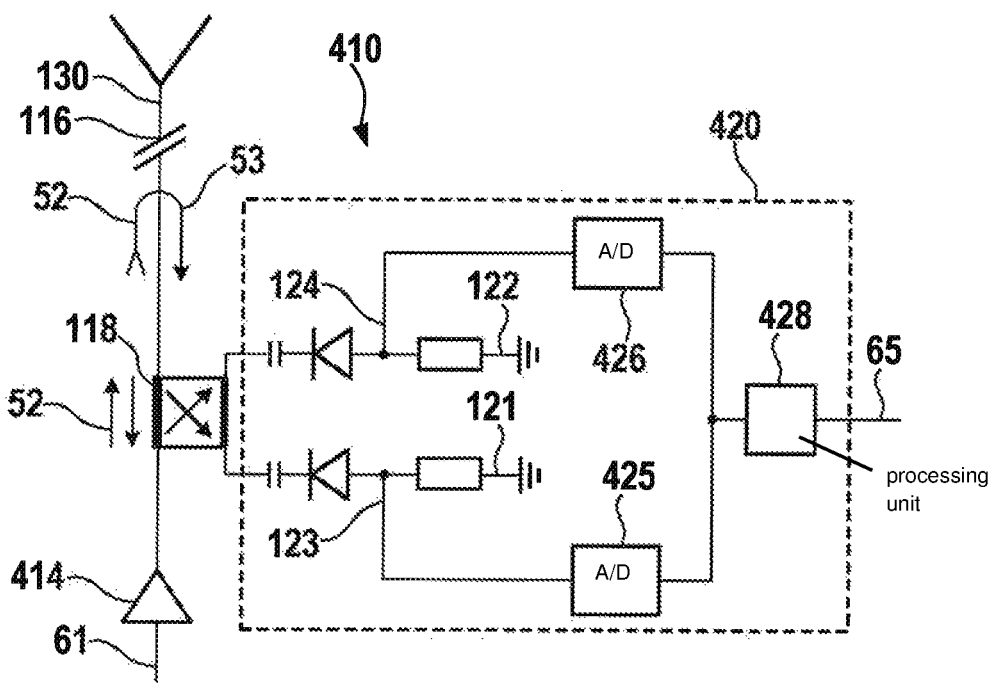
FIG. 5 shows a schematic circuit diagram of a device for processing or generating a signal according to yet another specific embodiment of the present invention.

FIG. 5 shows a schematic circuit diagram of a device 410 for processing or generating a signal 51, 52 according to yet another specific embodiment of the present invention.

Device 410 is a variant of device 110, so that elements already described with regard to device 110 are not described again.

Device 410 differs from device 110 with respect to an output device 420 of device 410, which takes the place of output device 120 of device 110. Output device 420 includes first and second measuring devices 121, 122 as described with regard to device 110. First electrical contact 123 of first measuring device 121 is connected to a first analog-digital converter 425 of output device 420, which is designed for digitizing first signals 51, 53 from first measuring device 121 and transmitting them to a processing unit 428 of output device 420. Second electrical contact 124 of second measuring device 122 is connected to a second analog-digital converter 426 of output device 420, which is designed for digitizing second signals 52' from second measuring device 122 and transmitting them to processing unit 428 of output device 420.

Processing unit 428 is designed for generating and outputting an output signal 65 which is based on digitized first and second signals 51, 52', 53 and which indicates the adjustment of device 410. Output signal 65 may be provided, for example, at a contact point of device 410 so as to be tappable for external devices.

Figure 6:
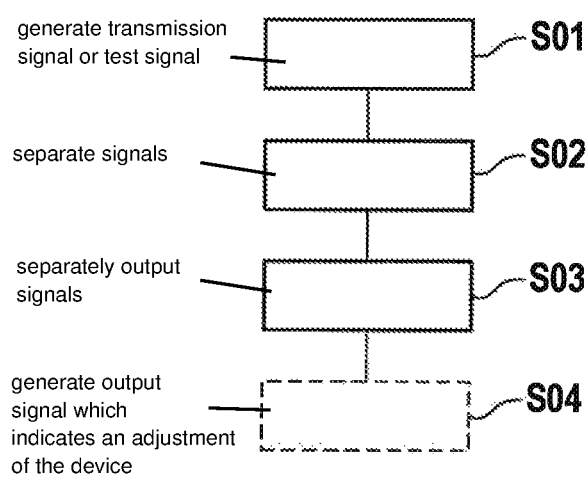
FIG. 6 shows a schematic flow chart for explaining a method for ascertaining an adjustment of a device for processing or generating a signal according to another specific embodiment of the present invention.

FIG. 6 shows a schematic flow chart for explaining a method for ascertaining an adjustment of a device 10; 110; 210; 310; 410 for processing or generating a signal 51, 52, 52' according to another specific embodiment of the present invention. The method according to FIG. 6 may be carried out in particular with the aid of the device according to the present invention, in particular with the aid of one of the described devices 10; 110; 210; 310; 410. The method according to FIG. 6 is therefore adaptable to all modifications and refinements described with regard to the device according to the present invention, in particular devices 10; 110; 210; 310; 410, and vice versa.

A transmission signal 52 or a test signal 63 is generated in a first step S01 with the aid of a signal device 14; 114; 214; 314 of a device 10; 110; 210; 310; 410 for processing or generating a signal 51, 52, in particular as described above with regard to signal devices 14; 114; 214; 314.

First signals 51, 53, which come to signal device 14; 114; 214; 314 from an interface device 16; 116 of device 10; 110; 210; 310; 410, are separated from second signals 52; 52' which come to interface device 16; 116 from signal device 14; 114; 214; 314, in a step S02. Interface device 16; 116 is in particular coupleable or coupled to a transmitting and/or receiving antenna 30; 130; 330. First signals 51, 53 and second signals 52; 52' are separately output in a step S03. An output signal 65 which indicates an adjustment of device 10; 110; 210; 310; 410 is generated based on first and second signals 51, 52, 52', 53 in an optional step S04. The method according to FIG. 6 may be carried out continuously during a transmission operation of device 10; 110; 210; 310; 410. Alternatively or additionally, the method according to FIG. 6 may be carried out in a test mode of device 10; 110; 210; 310; 410 as described above.

What is claimed is:

1. A device for processing or generating a signal, comprising:
a substrate;
a signal device that is designed for at least one of processing a reception signal and generating a transmission signal;
an interface device with the aid of which the signal device is coupled to at least one of a transmitting and receiving antenna for at least one of transmitting the generated transmission signal, and receiving the reception signal to be processed;
a separation device that is designed for separating first signals, which come to the signal device from the interface device, from second signals which come to the interface device from the signal device;
an output device at which the separated first and second signals are separately tappable for computing an adjustment, the output device:
tapping the first signals,
tapping the second signals, and
computing the adjustment on the basis of the tapped first signals and the tapped second signals;
wherein the signal device, the interface device, the separation device, and the output device are situated on the substrate, wherein the adjustment represents a quotient of a reflected power output and a continuous power output without reflection, wherein the adjustment indicates a reduction in a transmission power output of the transmission signal, wherein the reduction is by a reflected signal that results from the transmission signal being one of partially and completely reflected at least one of on the interface device and on a junction point between the interface and the antenna.

2. The device as recited in claim 1, wherein the substrate together with the signal device, the interface device, the separation device, and the output device, is designed as a monolithic microwave circuit.

3. The device as recited in claim 1, wherein the separation device is one of a directional coupler or as a ring coupler.

4. The device as recited in claim 3, wherein the separation device is designed with four ports.

5. The device as recited in claim 1, wherein the output device includes a processing unit that is designed for generating, based on the separated first and second signals, an output signal that indicates an adjustment of the device.

6. The device as recited in claim 1, wherein the output device includes a first analog-digital converter that is designed for converting the first signals from analog signals into digital signals; and the output device includes a second analog-digital converter that is designed for converting the second signals from analog signals into digital signals.

7. The device as recited in claim 1, wherein the signal device is designed for processing a reception signal, and includes a mixer and a test signal provision device, the test signal provision device being designed for providing a test signal and feeding it nondirectionally between the separation device and the mixer.

8. A method for ascertaining an adjustment of a device for processing or generating a signal, comprising:
generating one of a transmission signal or a test signal, with the aid of a signal device of the device;
separating first signals, which come to the signal device from an interface device of the device, from second signals which come to the interface device from the signal device, the interface device being coupled to at least one of a transmitting and receiving antenna;
outputting the first signals and the second signals separately from one another such that the first signals and the second signals are separately tapped, the first and second signals being output to an output device that:
taps the first signals,
taps the second signals, and
computes the adjustment on the basis of the tapped first signals and the tapped second signals, wherein the adjustment represents a quotient of a reflected power output and a continuous power output without reflection, wherein the adjustment indicates a reduction in a transmission power output of the transmission signal, wherein the reduction is by a reflected signal that results from the transmission signal being one of partially and completely reflected at least one of on the interface device and on a junction point between the interface and the antenna.

9. The method as recited in claim 8, wherein the method is carried out continuously during a transmission operation of the device.

10. The method as recited in claim 8, wherein the method is carried out in a test mode of the device.

\* \* \* \* \*